(12) United States Patent
Knevels

(10) Patent No.: US 10,513,142 B2
(45) Date of Patent: Dec. 24, 2019

(54) TILE WITH TEXTURE

(71) Applicant: Polyvision NV, Genk (BE)

(72) Inventor: Gunther Knevels, Peer (BE)

(73) Assignee: POLYVISION NV, Genk (BE)

( * ) Notice: Subject to any disclaimer, the term of this patent is extended or adjusted under 35 U.S.C. 154(b) by 54 days.

(21) Appl. No.: 15/771,898

(22) PCT Filed: Dec. 22, 2016

(86) PCT No.: PCT/IB2016/057929
§ 371 (c)(1),
(2) Date: Apr. 27, 2018

(87) PCT Pub. No.: WO2017/122069
PCT Pub. Date: Jul. 20, 2017

(65) Prior Publication Data
US 2019/0061416 A1 Feb. 28, 2019

(30) Foreign Application Priority Data

Jan. 14, 2016 (BE) .................................. 20165025

(51) Int. Cl.
*B44C 5/04* (2006.01)
*C03C 17/02* (2006.01)
(Continued)

(52) U.S. Cl.
CPC ............ *B44C 5/0415* (2013.01); *B32B 15/04* (2013.01); *B44C 3/025* (2013.01); *B44C 5/0461* (2013.01); *B44F 9/02* (2013.01); *B44F 9/04* (2013.01); *B44F 9/10* (2013.01); *C03C 17/02* (2013.01); *E04F 13/0866* (2013.01);
(Continued)

(58) Field of Classification Search
CPC .............................. B44C 5/0415; C03C 17/02
See application file for complete search history.

(56) References Cited

U.S. PATENT DOCUMENTS

| | | | |
|---|---|---|---|
| 1,852,759 A | 4/1932 | Shaw et al. | |
| 5,077,112 A * | 12/1991 | Hensel | E04F 15/02 427/488 |

(Continued)

FOREIGN PATENT DOCUMENTS

| | | |
|---|---|---|
| DE | 2810371 | 6/1979 |
| EP | 2019267 | 1/2009 |

(Continued)

OTHER PUBLICATIONS

European Patent Office; International Search Report; dated Jul. 13, 2017.

(Continued)

*Primary Examiner* — Betelhem Shewareged
(74) *Attorney, Agent, or Firm* — Price Heneveld LLP

(57) ABSTRACT

A tile for wall, floor or ceiling covering that includes a first layer consisting of metal, a second layer consisting of enamel that is chemically bonded to the first layer, a third layer consisting of an image in glass ink printed onto the second layer, and one or more overlay layer printed onto the third layer, using that same image, and which only partially covers the third layer such that texture is given to the surface of the tile and a more realistic impression of said image is created.

18 Claims, 4 Drawing Sheets

(51) Int. Cl.
- *B44C 3/02* (2006.01)
- *B44F 9/02* (2006.01)
- *B44F 9/04* (2006.01)
- *E04F 15/06* (2006.01)
- *B32B 15/04* (2006.01)
- *B44F 9/10* (2006.01)
- *E04F 13/08* (2006.01)
- *E04F 13/12* (2006.01)

(52) U.S. Cl.
CPC ........ *E04F 13/0873* (2013.01); *E04F 13/123* (2013.01); *E04F 15/06* (2013.01); *B32B 2255/00* (2013.01); *B32B 2419/04* (2013.01); *B32B 2451/00* (2013.01)

(56) References Cited

U.S. PATENT DOCUMENTS

| | | |
|---|---|---|
| 5,985,416 A | 11/1999 | Sherman et al. |
| 6,504,559 B1 | 1/2003 | Newton et al. |
| 2003/0152780 A1* | 8/2003 | Baumann ................ B08B 17/06 428/429 |
| 2007/0190256 A1 | 8/2007 | Darby et al. |
| 2013/0004703 A1* | 1/2013 | Kwon .................... B32B 13/12 428/106 |
| 2013/0295346 A1* | 11/2013 | Ferguson ................. E04C 2/26 428/196 |
| 2014/0290511 A1 | 10/2014 | Stecker |

FOREIGN PATENT DOCUMENTS

| | | |
|---|---|---|
| EP | 2213213 | 8/2010 |
| EP | 2952359 | 12/2015 |
| GB | 726198 | 3/1955 |
| GB | 1394122 | 5/1975 |
| WO | 2012075548 | 6/2012 |

OTHER PUBLICATIONS

Xaar, "A Guide to Ceramic Tile Digital Decoration," Sep. 2, 2014, all pages, Issue 2, Cambridge, United Kingdom.

* cited by examiner

TILE WITH TEXTURE

TECHNICAL FIELD OF THE INVENTION

The present invention relates to tiles for wall, floor or ceiling covering. Such tiles are used in the interior of residential or office buildings, for example in kitchens or bathrooms. Such tiles are also used in major infrastructure projects, for example subway stations, tunnels, theme parks, shopping malls, airports, hospitals, etc.

BACKGROUND OF THE INVENTION

Of the tiles that are used as wall, floor or ceiling covering in public places such as subway stations, tunnels, theme parks, etc., it is expected that they are strong, durable, easily washable, easy maintainable, and are vandalism resistant. For specific applications such as hospitals, it is required that the tiles that are used for wall, floor-, or ceiling covering moreover are chemically inert. For other applications such as wall covering in meeting rooms of office buildings it can be desirable that the tiles have certain magnetic properties so that the wall can be used as a magnetic plate.

Ceramic tiles have some of the above characteristics and the use of such ceramic tiles for wall, floor or ceiling covering is therefore known. The brochure "A Guide to Ceramic Tile Digital Decoration" by XAAR, published on 2 Sep. 2014, mentions on page 13 that such ceramic tiles can be printed with images to achieve certain decorative effects. By using ink-jet printing images can be applied to flat, ceramic tiles so as to for example mimic marble or natural stone. Furthermore the brochure by XAAR mentions on page 33 that texture can be applied to the surface of ceramic tiles through press processing. Texture in the surface of ceramic tiles makes the colored patterns or images that are printed on the tiles even more realistic. Traditional, non-digital pressing is an expensive process. XAAR predicts in its brochure of the 2 Sep. 2014 that traditional presses will be replaced in the future by a digital press process that can be set up faster and more cost efficiently.

In situations where tiles have to mimic certain materials such as marble, wood, etc., the smooth and glossy surfaces of ceramic tiles do not provide a sufficiently realistic impression so that the emotion of such materials, such as the warmth of wood, are not or not perfectly evoked. Texture application through non-digital or digital presses such as suggested by XAAR brings improvement, but pressing remains an expensive and complex process.

There are alternative techniques to apply bas-relief or texture to the surface of tiles. As mentioned by the American patent application US2014/0290511A1 titled "Methods of Producing Articles Having Three-Dimensional Topography" in section [0002] which uses laser technology to remove material from a surface by which the surface gets texture. Paragraph [0003] of the same American patent application reports that use can be made of an injection-molding technique with molds which provide bas-relief or texture to the surface. Another alternative is a stamp technique to modify the surface so as to apply structure and thus bas-relief to the surface (see paragraph [0004] of US2014/0290511A1). According to paragraph [0005] of US2014/0290511A1 one can deposit polymer material on a surface which also results in texture. However, all these known techniques are expensive and complex, as is also mentioned by US2014/0290511A1 in paragraph [0006]. US2014/0290511A1 claims to have found a lower-cost technique for applying texture to a surface in the application of ceramic powder through a screen process. Even if this screen process with ceramic powder is cheaper than the known techniques, increasing realism and emotion emanating from a color pattern or color image has not become any easier. After all, a two-dimensional color image needs according to US2014/0290511A1, paragraph [0011] to be printed on the texturized surface and printing on a non-planar surface is anything but easy.

Ceramic tiles also do not have a number of the above desired properties. For example, ceramic tiles have no magnetic properties and their strength is limited which means they can still crack, crumble, etc. in the case of vandalism or strong vibrations.

The European patent application EP2019267A2 titled "Aussenverkleidung einer Heizvorrichtung" describes a tile used in decorative interior applications such as covering of fireplaces or furnaces. The tile from EP 2019267A2 consists of a metal sheet that is being printed with a picture. On top of the image a transparent enamel layer is applied which may be suited to the image and bas-relief or texture applied to the surface of the tile. The tile from EP2019267A2 has as disadvantage that an image has to be printed on metal and that texture consists of gloss enamel making it again difficult to display highly realistic images such as a wood grain pattern and to evoke the associated emotions.

Outside the field of the present invention it is known from European patent application EP2213213A1 to apply a transparent anti-slip layer onto a sanitary surface, for example bottom surface of a bathtub, through a screen printing process. The anti-slip layer does not enhance the realism and the emotion of a two-dimensional image that was printed onto the sanitary surface. On the contrary, the anti-slip layer consists of its own pattern and therefore forms a second image that is applied over the printed image so that the image is partially hidden and/or at least blurred.

Furthermore, the international patent application WO2012/075548 titled "Heating Element" describes a heating element (11 in FIG. 3) which can be embedded into a vertical wall or a ceiling. The heating element from WO2012/075548 has better decorative properties and consists of a steel plate (13 in FIG. 3), a first enamel base layer (14 in FIG. 3), a second enamel top layer (14a in FIG. 3), and a printed image (14b in FIG. 3). The enamel top layer (14a) and the printed image (14b) receive a thermal treatment above 600° C.

In yet another domain, the British patent application GB726,198 suggests to give an alert plate, for example a license plate of a vehicle, better reflection properties by scattering glass beads by means of a laser over an enameled metal plate. Although the glass beads give a rougher texture to the surface of the enameled metal plate, they do not improve the realism and emotion of a two-dimensional image printed beneath.

In the domain of the alert plates the American patent U.S. Pat. No. 1,852,759 further describes a technique for making an enamel alert plate with two colors. On a metal plate (16 in FIG. 1), an enamel base layer (10 in FIG. 1) is applied. On top of that, an enamel coating (14 in FIG. 1) is applied. Finally, a final coating (16 in FIG. 1) is applied in a different color from the enamel coating (14 in FIG. 1). By means of a stencil (18 in FIG. 1) with openings (20 in FIG. 1) and a brush technique applied at the position of the openings (20 in FIG. 1) parts of the final coating (22 in FIG. 1) are then removed so that the color of the enamel coating (14 in FIG. 1) is there made visible. In this way, alert plates with 2 colors could be acquired in 1930.

SUMMARY OF THE INVENTION

The present invention has the object to solve the above mentioned disadvantages of the existing solutions by providing a tile for wall, floor to ceiling covering which is strong, durable, vandalism resistant and easy to wash/maintain, and that allows for the displaying of more realistic images that are printed on such tile, and to better evoke the emotions that are associated with such images.

According to a first aspect, the present invention relates to a tile for wall, floor or ceiling covering, the tile comprising:
- a first layer consisting of metal;
- a second layer consisting of enamel, wherein said second layer is chemically bonded to said first layer;
- a third layer consisting of an image in glass ink printed onto the second layer; and
- one or more incomplete overlay layer which is printed onto the third layer, consisting of an incomplete version of the same image which only partially covers the third layer such that texture is given to the surface of the tile and a more realistic impression of the image is created.

According to the invention metal-ceramic tiles are provided with a three-dimensional surface structure. The thus obtained tile contains a first layer of metal, for example steel with a thickness of 0.3 mm, which gives strength to the tile and makes the tile resistant to vandalism. Due to reasons of corrosion or adhesion one or more additional layers can optionally be applied to the bottom onto this first layer, in the assumption that the second layer, third layer and one or more overlay layer which are discussed below will be applied on the top of the metal layer. The tile further includes a second layer of enamel, for example, porcelain enamel with a thickness of 0.1 mm, which is chemically bonded onto the metal. The chemical binding can for example be achieved by first applying a base layer of porcelain enamel having a thickness of for example 0.1 mm onto the metal. Such base layer of porcelain enamel can also be applied onto the bottom of the metal to prevent corrosion of the tile when for example no stainless steel was used for the metal layer. The enamel layer ensures easy washing and maintenance of the tile. On the second layer consisting of enamel a two-dimensional image is printed. The image can be an image in color or black/white and typically represents something that has a three-dimensional structure in reality. For example, the image may represent the structure of wood grain, the structure of rougher stone, an animal skin with fish scales, pores, etc. The image is printed in glass ink, for example through an ink-jet process, and has a thickness of for example 5 micron. The same image as that was printed in glass ink on the enamel layer is then used to apply one or more partial layers on the tile. Thus, in a simple version of the tile according to the invention one overlay layer is applied for example of 20 micron screen-printed transparent or colored enamel onto the grain edges of the printed wood structure underneath. The overlay layer or layers add texture to the tile surface which adds depth and shading to the image, and a more realistic representation of the image is obtained. Also the tactile properties of the tile surface are improved: as an image of wood will feel as wood because the overlay layer or layers will mimic the grain structure of a real wood surface. The more realistic representation and improved tactile properties of the tile surface provide a stronger experience and emotion.

In an embodiment of the tile according to the invention, the one or more overlay layer consists out of transparent material.

By using transparent material for the overlay layer or layers the colors of the underlying image remain untouched, but only depth will be given to the underlying image to obtain greater realism. In alternative embodiments of the tile where non-transparent material is used, structures, cavities, depths or heights, shades and such can be more highlighted. Thus, a wood grain can be colored more darkly, a pore or cavity in the skin can be colored more darkly, a protruding portion colored brighter, etc. whereby de emotion or experience that radiates from a surface is even more realistic.

In an embodiment of the tile according to the invention, each of the one or more overlay layer has a minimum height of 10 micron.

Indeed, if an overlay layer consists of porcelain enamel that is applied by a screen print process onto the printed image, then the overlay-layer will have a minimum thickness of 10 micron. In a to be chosen embodiment of the tile the overlay layer will have a thickness of 15 micron.

In an embodiment of the tile according to the invention, each of the one or more overlay layer has a minimum height of 3 micron.

Indeed, if an overlay layer consists of ink which is applied through a digital ink-jet process to the printed image, then the overlay-layer will have a minimum thickness of 3 micron. In a to be chosen embodiment of the tile the overlay layer will have a thickness of 5 micron.

An embodiment of the tile according to the invention, comprises multiple overlay layers that cover identical parts of the image from the third layer.

By applying multiple overlay layers on identical parts of the image, greater differences in height can be applied to the surface, such that a rougher texture can be obtained.

An embodiment of the tile according to the invention, comprises multiple overlay layers that cover non-identical parts of the image from the third layer.

By applying multiple overlay layers to non-identical parts of the image, different heights can be applied to the surface, such that a more complex texture can be obtained.

In an embodiment of the tile according to the invention, said overlay layer covers the color changes color or color transitions in the image.

Indeed, the image that is printed as a third layer, can be re-used for the overlay layer or layers, for example in a screen printing process in which the film or screen is designed in such a way that the overlay layer or layers only cover color transitions or color changes. In this way, the texture which is applied onto the tile surface will give depth to the color transitions or color changes in the image and will reinforce the realism or emotion of the image.

In an embodiment of the tile according to the invention the image corresponds to an image of a material.

For decorative applications such as wall, floor or ceiling covering it is desired on the one hand that tiles are used which are strong, durable, vandalism resistant, washable and maintainable, but there is also on the other hand the desire to mimic traditional materials and the emotions they trigger as well as possible, even if these traditional materials do not have above mentioned properties. The texturized metal-ceramic tile according to the invention which is printed and provided with one or more overlay layers can realize these wishes when the image that is used for the printing and for the overlay layers displays the structure of the desired material.

In embodiments of the tile according to the invention, the material being displayed corresponds to one of following materials:
- wood;
- natural stone;
- metal.

The warm atmosphere or emotion that wood as a material for wall, floor or ceiling coverings evokes, can thanks to the tile according to the invention realistically be transferred to applications such as walls of metro stations where timber itself is unusable because it is not sufficiently strong, vandalism resistant, fire resistant, washable and maintainable. The same applies to natural stone such as marble, bluestone, granite, etc., and brushed metal, such as steel, copper, zinc, etc. The present invention is, however, not limited to the mimicking of these materials. Thus, images of other materials such as, for example certain composites that are used in interior, can be used or images of animals, landscapes, people, art, etc. which each through the overlay layer or layers gain texture and therefore be displayed with more realism and stronger emotions.

According to a second aspect, the present invention relates to the use of a screen printing process in the production of a tile for wall, floor or ceiling covering, the tile comprises:
- a first layer consisting of metal;
- a second layer consisting of enamel, wherein the second layer is chemically bonded to the first layer;
- a third layer consisting of an image in glass ink printed onto the layer; and
- one or more incomplete overlay layer which is printed through the screen printing process onto the third layer, making use of the same image and which only partially covers said third layer such that texture is given to the surface of the tile and a more realistic impression of the image is created.

In the screen printing process the image that has already been printed on the metal-ceramic tile is processed. A film is pressed, for example a black and white version or negative of the image, which is then used to make a screen. The screen is then used to partially apply an overlay layer of transparent or colored porcelain enamel to the printed image such that texture is given to the tile which will make the image more vivid and realistic. The overlay layer or layers are dried and/or burned as part of the screen printing process. Screen printing is a technique that makes it possible to apply overlay-layers with a minimum thickness of 5 micron and typical thicknesses of 20 micron. Multiple overlay layers can be applied with the same screen so that greater differences in height on the tile surface can be realized. It is also possible to apply multiple overlay layers with different screens each of which is made from the image that has already been printed on the tile. In that manner a tile can be manufactured with very complex texture which comprises multiple heights and thereby transfers certain materials and the accompanying emotions even more realistically onto the ceramic tiles.

According to a third aspect, the present invention relates to the use of a digital printing process in the production of a tile for wall, floor or ceiling covering, wherein the tile comprises:
- a first layer consisting of metal;
- a second layer consisting of enamel, wherein the second layer is chemically bonded to the first layer;
- a third layer consisting of an image printed in glass ink printed onto the second layer; and
- one or more incomplete overlay layer which is printed through the digital printing process onto the third layer, making use of the same image, and which only partially covers the third layer such that texture is given to the surface of the tile and a more realistic impression of the image is created.

By means of a digital printing process finer texture can be transferred to the metal-ceramic tile according to the invention. The image which has already been printed onto the tile with glass ink, can be reused to apply one or multiple overlay-layers that each have a minimum height of 1 micron and a typical height of 3 micron. The ink layers which can be applied through the digital printing process, are indeed typically less high than the layers which are applied via a screen printing process, allowing the texture to be made even finer and more complex. Depending on the application and the image this can be desirable. The overlay layers which are applied through a printing process may be dried and/or burned as part of that digital printing process.

DESCRIPTION OF THE EMBODIMENTS

Figure 1:
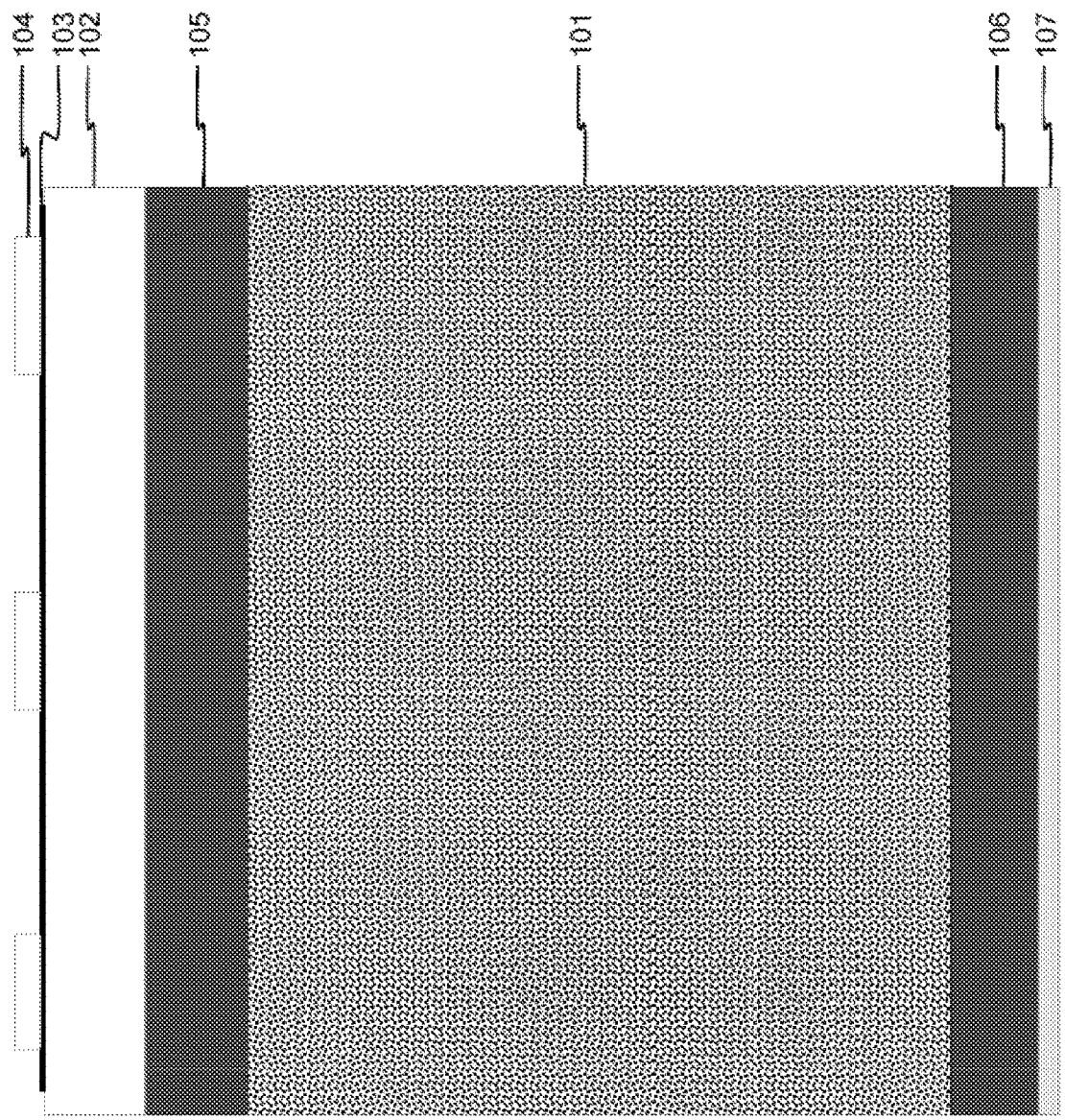
FIG. 1 illustrates the cross-section of an embodiment of the tile according to the invention.

FIG. 1 shows the cross-section of an embodiment of the metal-ceramic tile with texture 100 according to the invention. The tile 100 includes steel-layer 101 with a thickness of 560 micron. The steel-layer 101 was coated at the top with a base layer of porcelain enamel 105 having a thickness of 80 micron. This base layer of porcelain enamel 105 provides chemical bonding with a layer of porcelain enamel 102 applied thereon which also has a thickness of 80 micron. This porcelain enamel layer 102 is a cover layer that is suitable to be printed with glass ink. The steel-layer 101 was coated at the bottom with a base layer of porcelain enamel 106 having a thickness of 70 micron. This base layer 106 was applied to protect the steel 101 against corrosion, and was further provided with a rough porcelain enamel coating layer 107 of 15 micron thickness. In the case that SST or stainless steel is used for the steel-layer 101, then the porcelain enamel layers 106 and 107 are superfluous, and also the chemical bonding of the porcelain enamel layer 102 on the steel 101 will be realized differently. On top of the porcelain enamel layer 102 an image 103 was printed. The image 103 was printed in glass ink by a digital ink-jet process and has a thickness of 3 micron. The image 103 was finally used in a screen printing process to apply an overlay layer of transparent and/or colored porcelain enamel 104 onto parts of the image 103. The overlay layer 104 gives texture to the surface of the tile 100 and is aligned to the underlying image 103 which gives more liveliness, depth, emotion and realism to the image 103.

Figure 2A:
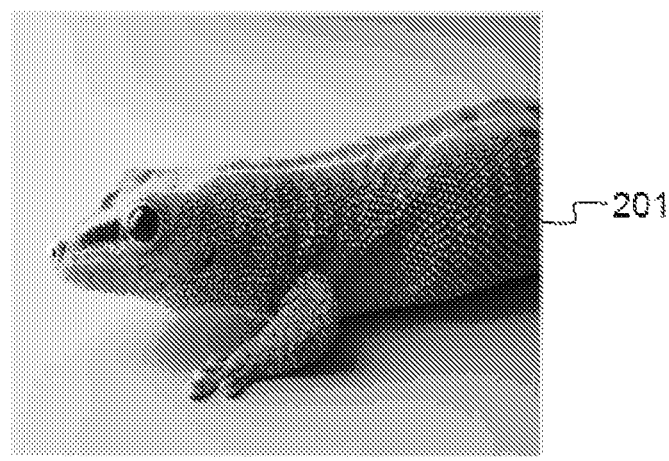
FIG. 2A illustrates a first image which is used for the making of a first embodiment of the tile according to the invention.
Figure 2B:
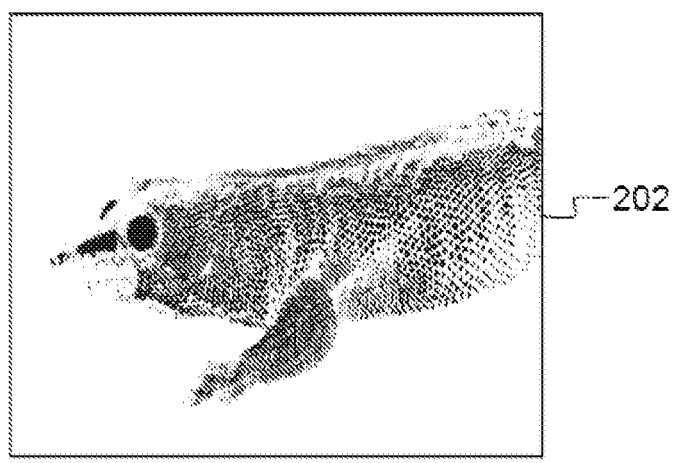
FIG. 2B illustrates a film made of the first image from FIG. 2A, which is used in a screen printing process for making the first embodiment of the tile according to the invention.
Figure 2C:
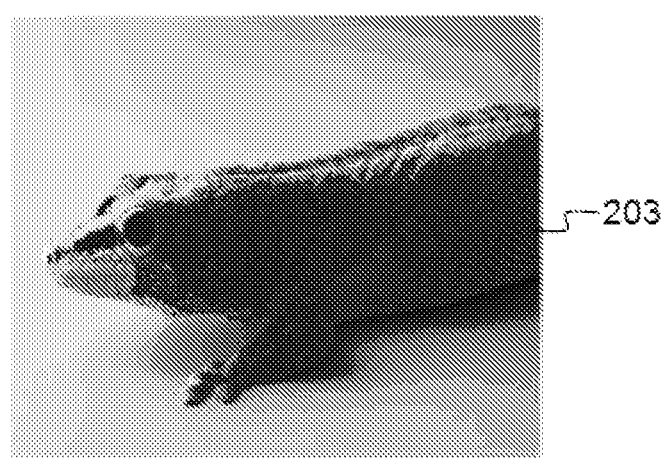
FIG. 2C illustrates the first embodiment of the tile according to the invention for which the image from FIG. 2A was used.

FIG. 2A shows an image 201 which is used for the making of a metal-ceramic tile with texture 203 according to the invention. The image 201 is printed through a digital ink-jet process on top of a tile that contains a metal layer and enamel layer which is chemically bonded onto the metal layer. The image 201 is a color image of a reptile of which the skin scales are displayed and thus has a certain degree of texture. Subsequently the image 201 is used to make a film 202 that is suitable for use in a screen printing process. The film 202 is shown in FIG. 2B. The protrusions such as scales and eyes of the reptile are colored black in the screen so that when screen printing material is applied at these locations such that an overlay-layer will form in front of the image 201. The result is a metal-ceramic tile with texture 203 which is shown in FIG. 2C. In FIG. 2C the overlay is colored black. The black or dark-colored parts in FIG. 2C therefore have texture and enhance the emotion and realism of image 201 which is located underneath the overlay. The tactile properties of the tile 203 are also considerably better. When the tile 203 is touched the scales on the skin of the reptile, and other protrusions such as the eyeballs will be felt which provides an additional experience.

Figure 3A:
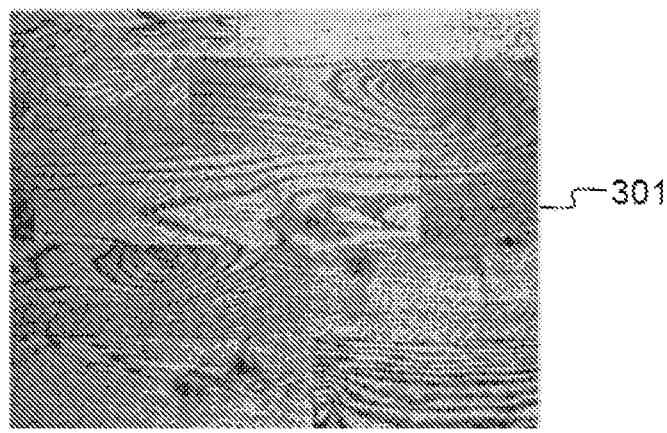
FIG. 3A illustrates a second image that is used for the making of a second embodiment of the tile according to the invention.
Figure 3B:
FIG. 3B illustrates a film made of the second image from FIG. 3A, which is used in a screen printing process for making the second embodiment of the tile according to the invention.
Figure 3C:
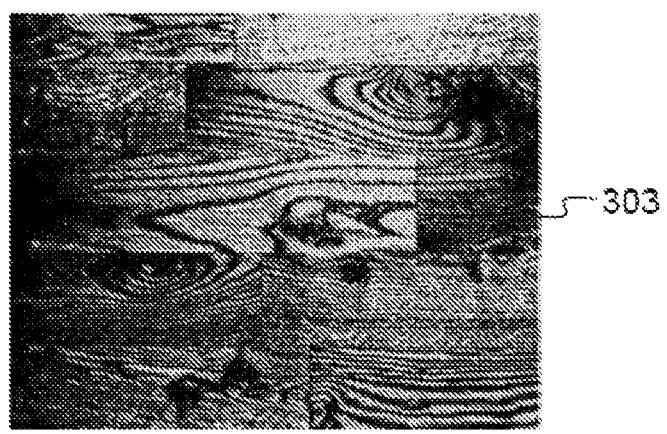
FIG. 3C illustrates the second embodiment of the tile according to the invention for which the image from FIG. 3A was used.

FIG. 3A shows a second image 301 which is used for the making of a second metal-ceramic tile with texture 303 according to the invention. The image 301 is printed via a digital ink-jet process on top of the tile that contains a metal layer and enamel layer which are chemically bonded to the metal layer. The image 301 is a color image of wood with a grain structure which in reality has a certain texture of roughness. Then, the image 301 is used to create a film 302 which is suitable for use in a screen printing process. The film 302 is shown in FIG. 3B. The grain of the wood is colored black in the screen 302 so that when screen printing material will be applied on these locations which will form an overlay layer for the image 301. The result is a metal-ceramic tile with texture 303 that is shown in FIG. 3C. In FIG. 3C the overlay is colored black or dark. The black or dark colored parts in FIG. 3C therefore have texture and improved emotion and realism of image 301 which is located underneath the overlay. The tactile properties of the tile 303 is also again better. When the tile 303 is touched the grain of the wood can be felt which provides an additional experience.

Figure 4:
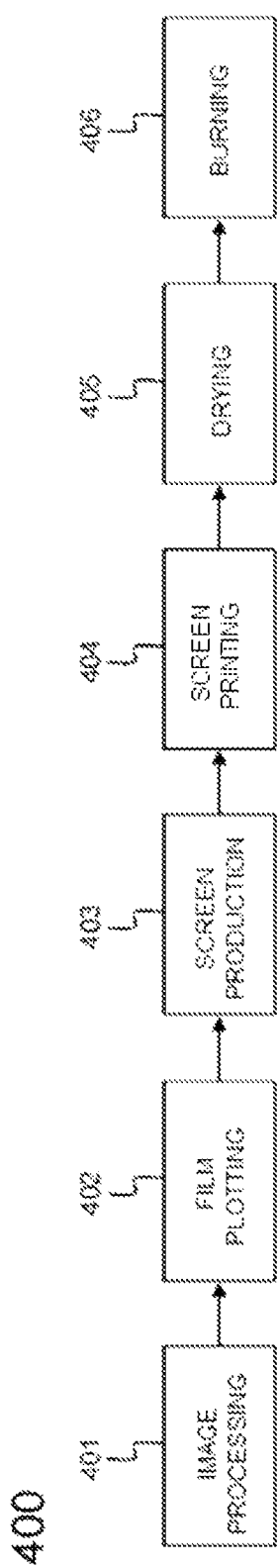
FIG. 4 illustrates a screen printing process 400 as is used in embodiments of the present invention.

FIG. 4 illustrates a screen printing process 400 is used in embodiments of the present invention. In a first step, 401, the image that will be used for the manufacture of the tile is processed. The image which is processed in this step is identical to the image that was printed previously in glass ink onto the enamel of the tile. Thereafter, in a second step, 402, a film is made of the image. The film is used in step 403 to produce a screen for the screen printing process. The actual screen printing in wherein one or more overlay layers in transparent or colored material, for example enamel, will be applied to parts of the already printed image, takes place in step 404. The overlay layers are finally dried in step 405 and burned in step 406.

Figure 5:
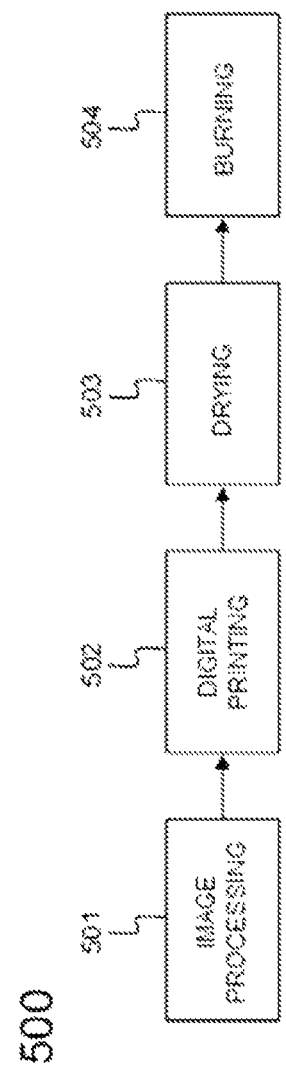
FIG. 5 illustrates a digital printing process 500 as is used in embodiments of the present invention.

FIG. 5 illustrates a digital printing process 500 such as is used in embodiments of the present invention. Also, in the digital printing process the same image is used as the one that has previously been printed onto the enamel of the tile. That image is processed in a first step 501. The processed image is then digitally printed as overlay layer or layers on top of the already printed image. This is done in step 502. Finally, the overlay layers are dried in step 503 and burned in step 504.

Although the present invention has been illustrated with reference to specific embodiments it will be apparent to those skilled in the art that the invention is not limited to the details of the foregoing illustrative embodiments, and that the present invention can be embodied with various changes and modifications without thereby departing from the scope of the invention. The present embodiments are therefore to be considered in all aspects as being illustrative and not restrictive, wherein the scope of the invention will be defined by the appended claims and not by the foregoing description, and all changes which fall within the meaning and scope of the claims, are here therefore included. In other words, it is assumed that all modifications, variations or equivalents fall within the scope of the basic underlying principles and of which the essential attributes are claimed in this patent application. Moreover, the reader of this patent application will understand that the words "comprising" or "comprise" does not exclude other elements or steps, that the word "a" does not exclude plurality, and that a single element, such as a computer system, a processor, or another integrated unit can fulfill the various tools that are mentioned in the claims. Any references in the claims should not be construed as a limitation of the claim in question. Finally, it should be understood that the terms "top", "bottom", "over", "underneath" and the like are used for the benefit of the description and that these terms are interchangeable under the correct circumstances and that embodiments of the invention are able to function according to the present invention in other orientations than described or illustrated in the above.

The invention claimed is:

1. A tile for wall, floor or ceiling covering, the tile comprising:
   a first layer comprising metal;
   a second layer comprising enamel, wherein the second layer is chemically bonded to the first layer;
   a third layer comprising an image in glass ink printed onto the second layer; and
   at least one incomplete overlay layer which is printed onto the third layer, comprising an incomplete version of the image which only partially covers the third layer such that texture is given to the surface of the tile and a more realistic impression of the image is created.

2. The tile according to claim 1, wherein the at least one overlay layer is transparent.

3. The tile according to claim 2, wherein the at least one overlay layer has a minimum height of 10 micron.

4. The tile according to claim 3, wherein the at least one overlay layer has a minimum height of 3 micron.

5. The tile according to claim 4, wherein the at least one overlay layers includes multiple overlay layers which cover identical parts of the image from the third layer.

6. The tile according to claim 4, wherein the at least one overlay layers includes multiple overlay layers which cover non-identical parts of the image from the third layer.

7. The tile according to claim 4, wherein the at least one overlay layer covers color transitions in the image.

8. The tile according to claim 7, wherein the image corresponds to an image of a material.

9. The tile according to claim 8, wherein the material includes at least one of wood, natural stone, and metal.

10. The tile according to claim 1, wherein the at least one overlay layer has a minimum height of 10 micron.

11. The tile according to claim 10, wherein the at least one overlay layer has a minimum height of 3 micron.

12. The tile according to claim 1, wherein the at least one overlay layers includes multiple overlay layers which cover identical parts of the image from the third layer.

13. The tile according to claim 1, wherein the at least one overlay layers includes multiple overlay layers which cover non-identical parts of the image from the third layer.

14. The tile according to claim 1, wherein the at least one overlay layer covers color transitions in the image.

15. The tile according to claim 1, wherein the image corresponds to an image of a material.

16. The tile according to claim 15, wherein the material includes at least one of wood, natural stone, and metal.

17. A method for screen printing a tile for wall, floor or ceiling covering, the method comprising:
   providing a first layer comprising a metal;
   chemically bonding a second layer to the first layer, the second layer comprising an enamel;
   printing a third layer in glass ink onto the second layer, the third layer comprising an image; and
   screen printing at least one incomplete overlay layer onto the third layer, making use of the image, and which only partially covers the third layer, the at least one incomplete layer having texture.

18. A method of digital printing a tile for wall, floor or ceiling covering, the method comprising:
   providing a first layer comprising metal:
   chemically bonding a second layer to the first layer, the second layer comprising an enamel;
   printing a third layer in glass ink onto the second layer, the third layer including an image; and
   digitally printing at least one incomplete overlay layer onto the third layer, making use of the image, and which only partially covers the third layer, the at least one incomplete layer having texture.

\* \* \* \* \*